:::
United States Patent Office 3,331,883
Patented July 18, 1967

---

3,331,883
IODINATIVE HYDROCARBON CONVERSION
Clarence W. Bittner, Orinda, Calif., assignor to Shell Oil Company, New York, N.Y., a corporation of Delaware
No Drawing. Filed Apr. 9, 1964, Ser. No. 358,655
1 Claim. (Cl. 260—680)

ABSTRACT OF THE DISCLOSURE

In the vapor phase iodinative dehydrogenation of acyclic hydrocarbons of 4 to 5 carbon atoms to corresponding less saturated hydrocarbons, the dehydrogenation is carried out in the presence of a fluidized finely divided solid hydrogen iodide acceptor of sodium hydroxde physically and chemically combined with an inorganic acidic non-oxidizing oxide of silicon or aluminum, such as silica, alumina and silica-alumina, after which the separated resulting finely divided solid containing sodium iodide is reacted with oxygen to liberate the iodide as elemental iodine and to regenerate the acceptor, and both the liberated iodine and regenerated acceptor are recycled for further dehydrogenation of hydrocarbon.

---

This invention relates to an improved process for iodinative dehydrogenation of hydrocarbons containing aliphatic carbon atoms with hydrogen atoms thereon. More particularly, it relates to the iodinative dehydrogenation of a $C_4$ to $C_5$ acyclic aliphatic hydrocarbon to hydrocarbons having a higher carbon-to-hydrogen ratio.

The dehydrogenation of $C_4$ and $C_5$ hydrocarbons by subjecting a vaporous mixture of the hydrocarbon to a reactive proportion of free iodine is well-known; see British Patent 793,214. Furthermore, a water quench or suitable HI acceptor material has been utilized to minimize the reverse reaction or other side reactions. British Patent 895,500 discloses the use of certain metal oxides as HI acceptors in the reaction of iodine with organic compounds.

The overall process of the metal oxide-hydrogen iodide acceptance and subsequent oxidative regeneration of the iodine from the metal iodide, is represented by the two equations:

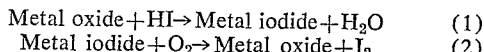
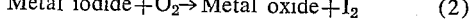

Metal oxide + HI → Metal iodide + $H_2O$  (1)
Metal iodide + $O_2$ → Metal oxide + $I_2$  (2)

A number of metals have favorable free energy changes for both of the above reactions and include arsenic, antimony, lead, zinc, cadmium, copper, nickel, cobalt, iron, manganese, calcium, lithium and cerium.

Although sodium oxide reacts readily with hydrogen iodide to yield sodium iodide and water (Equation 1), the reaction of oxygen with sodium iodide to form sodium oxide and iodine is thermodynamically unfavorable. However, the use of a sodium compound as HI acceptor would be desirable as it is readily available, economical and easily handled.

It is a principal object of the present invention to provide an improved iodinative dehydrogenation process, particularly one utilizing sodium oxide and/or hydroxide as HI acceptor, for the dehydrogenation of $C_nH_{2n}$ and $C_nH_{2n+2}$ hydrocarbons, wherein $n$ is a whole number from 4 to 5.

Now, in accordance with the present invention, it has been found that when sodium oxide/hydroxide is physically and chemically combined with a support of one or more solid high-melting stable inorganic acidic non-oxidizing oxides of an element having an atomic number of 13 to 14 or various combinations thereof, the composite reacts readily with hydrogen iodide in an iodinative dehydrogenation zone at an elevated temperature to form a composite of sodium iodide/oxide/hydroxide/support which readily reacts in a separate regeneration zone with oxygen or an oxygen-containing gas to liberate iodine and regenerate the acceptor composite. By the term "acidic" it is meant to describe an oxide which is salt forming with sodium oxide or hydroxide.

The support should be such that the sodium/iodide/oxide/hydroxide is sufficiently adherent to it at reaction temperature to provide and maintain sodium/iodide/oxide/hydroxide thereon while preferably leaving the solid mass fluidizable in pulverulent form. This is advantageously done by adding a portion or all of the sodium to the support initially as sodium silicate. Although it is most preferred to utilize from 2 to 3% by weight of sodium, calculated as NaOH, on the support, an amount up to 6% may be usefully used. As an illustration, a system for converting n-butane to butadiene would theoretically require about 100 parts by weight of 3% NaOH/solid to accept the HI resulting from 1 part by weight of n-butane being dehydrogenated to butadiene.

The advantages attendant the use of fluidized solid-reactant particulate material, will best be understood and appreciated by those familiar with the use of moving solid particles in a reaction zone. The principles, features and requisites of fluidization of finely divided solids are well-known and have been applied in various processing fields, especially catalytic cracking of petroleum fractions. They are readily adapted to the present invention and are more specifically set forth in copending U.S. patent application 277,732, filed May 3, 1963, and now abandoned.

This fluidized state can be obtained by passing a gas, or vapor, or in some cases a liquid which is rapidly vaporized upon contact with the solid, up through a bed of powdered solid. If a gas is introduced into the bottom of a settled bed of fluidized solid at a very low rate, the gas simply passes through the minute interstices and out of the top of the bed without affecting the bed itself. If the gas velocity is increased slowly, a point is reached at which the bed expands somewhat and the particles move about. The point at which this occurs may be called the minimum fluidization gas velocity. This minimum fluidization gas velocity depends somewhat upon the particular solid in question but is usually of the order of 0.01–0.20 foot per second for most fluidizable powders. It is advantageous in the operation of the present invention to maintain the ratio of the gas volume per gram of solid within certain limitations. It has been found that good advantages are obtained when 25–100 milliliters of gas are utilized per gram of solid acceptor material. Furthermore it is most desirable to utilize from 30 to 50 milliliters of gas per gram of solid acceptor material.

The iodinative dehydrogenation aspect of the invention involves subjecting a mixture containing at least one suitable feed hydrocarbon, e.g., butane, butene, 2-methyl-butane and 2-methyl-butene, and at least 0.10 mole of available iodine per mole of reactive hydrocarbon up to about a 3 molar proportion of iodine, with from 0.5 to about 2 molar proportions being preferred, to a temperature of at least 300° C. to dehydrogenate at least a substantial portion of the hydrocarbon whereby a hydrocarbon having a higher carbon-to-hydrogen ratio is produced. The oxygen requirement for regeneration in the process is approximately stoichiometric to the iodine released and to the desired dehydrogenation of the hydrocarbon feed. It is not necessary to strive for complete conversion of the hydrocarbon per pass, although high conversion percentage together with high selectivity to hydrocarbons of higher C-to-H ratios are desirable and an advantage of the invention together with enhanced efficiency of oxygen utilization. Generally, the regeneration of iodine and acceptor is carried out so that a portion of the iodine compounds remains in the acceptor composite, i.e., the regeneration is incomplete, generally being no more than about 95% complete. It will usually be at least about 30% for economical reasons. The amount of regenerating oxygen is adjusted accordingly.

The proportion of oxygen utilized in the regeneration to release the iodine may vary from about 0.025 mole of oxygen per mole of dehydrogenatable feed to the dehydrogenation zone to even as much as 5 moles of oxygen per mole of dehydrogenatable feed. The proportion of oxygen employed is determined at least in part by the results desired, and the physical requirements imposed by the way in which the process is operated, e.g., the relative gas and solids flow rates to maintain the selected type of contacting. While oxygen may be supplied to the regeneration zone in the form of relatively pure gas, it will, of course, be found that certain advantages may accrue from the use of air as an oxygen-containing gas.

Instead of using nitrogen-diluted oxygen, as in air, especially where larger gas volume is required to control solids fluidization and/or dispersion, steam may be used with the oxygen. The use of steam is further advantageous in that it increases the efficiency of iodine regeneration and minimizes conversion of iodide to undesirable periodate. Contrary to expectations, the use of steam in the system did not cause greater loss of sodium compound from the composite solid acceptor. This is an important factor when supplying steam as a solids-carrying gas to the dehydrogenation zone since it is readily separated from the effluent reaction products by condensation and phase separation.

Sodium oxide/hydroxide is provided on the acidic support, being added as such or formed in situ as by adding sodium iodide and then oxidizing it, in an amount taking into consideration the relative amounts of gases and their compositions and of solid contacted, sufficient to maintain the hydrogen iodide content of the system at an extremely low level (i.e., by reaction of the formed HI with the corresponding sodium oxide). Usually, the system is such that hydrogen iodide exists only momentarily, being almost immediately combined with the sodium oxide/hydroxide/support. For the most part the sodium oxide/hydroxide is on the porous acidic support at least partly chemically combined with the support in the form of a sodium silicate, a sodium aluminate and/or a sodium alumino-silicate. All of these possible chemical combinations are intended to be included in the term sodium oxide/hydroxide/support. It is preferred that the effective proportion of sodium iodide/oxide/hydroxide to acidic support be maintained from about 0.01:1 to about 0.5:1 so as to insure substantially immediate reaction of hydrogen iodide (formed in the dehydrogenation reaction) while still maintaining an essentially fluidized system of iodide supported on finely divided solid acidic particles.

Suitable support materials have been found to be siliceous or aluminous, including essentially pure silica, alumina and silica-alumina gels. Natural aluminosilicates and the like are also useful. The surface area of the support should be from about 50–700 meters$^2$/gram with the preferred range being 150–300 meters$^2$/gram. It is advantageous to have a pore volume of from about 0.05–0.5 milliliters/gram.

An example of a typical sieve analysis for a fresh silica-alumina support of this invention would be:

Mesh:
```
+100 _____ 1.4
100–170 _____ 25.6
170–200 _____ 17.7
200–250 _____ 5.5
250–270 _____ 20.6
270–325 _____ 16.6
−325 _____ 12.6
``` wherein the average particle size is 40–100μ. It is advantageous for the settled bulk density to be from 0.4 to 1.2 grams/cubic centimeter with the preferred range being about 0.7 to 0.9 gram/cubic centimeter.

A better understanding of the invention will be obtained from the comparative results in Table I on the regeneration of four different composites.

The sieve analysis of the fresh silica catalyst was as follows:

Mesh:
```
+115 _____ 8.1
115–150 _____ 14.8
150–170 _____ 12.4
170–200 _____ 11.2
200–270 _____ 25.1
270–325 _____ 13.4
−325 _____ 15.0
```

The solid acceptors in Table I were prepared by (1) determining the absorbability of the support material, (2)

TABLE I.—IODINE RELEASE FROM SUPPORTED IODIDES BY OXYGEN (NO HYDROCARBON PRESENT)

| Solid | LiI-LiOH on MgO | NaI-NaOH on MgO | NaI-NaOH on SiO$_2$ | NaI-NaOH on SiO$_2$/13% Al$_2$O$_3$ |
|---|---|---|---|---|
| Grams of Support | 409 | 293 | 180 | 350 |
| Impregnation: | | | | |
|   Cc. of solution | 196 | 191 | 153 | 280 |
|   Percent metal iodide in final solid | 15 | 18 | 18 | 16 |
|   Percent metal hydroxide in final solid | 1.6 | 2 | 2 | 4 |
|   Percent iodine as iodine in final solid (by analysis) | 11.3 | 11.4 | 13.8 | 20.9 |
| Temperature, °C | 300 | 300 | 537 | 300 |
| Iodide in Solid (expressed as mmoles I$_2$) | 10.98 | 11.23 | 20.54 | 11.68 |
| O$_2$ Fed, mmoles | 4.78 | 5.28 | 4.41 | 4.48 |
| I$_2$ Released, mmoles | 5.91 | 0.00 | 8.79 | 4.76 |
| Iodine Converted: | | | | |
|   Percent to I$_2$ | 92 | 0 | 99.6 | 99.2 |
|   Percent to IO$_4$ | 8 | 0 | [1] 0.4 | 0.8 |
| O$_2$ Consumed: | | | | |
|   Percent to I$_2$ | 60 | 0 | 95.3 | 93.8 |
|   Percent to IO$_4$ | 40 | 0 | [1] 4.7 | 6.2 |

[1] Max.

preparing that amount of solution which the support would absorb, (3) impregnating the support with the solution, and (4) drying the solid to obtain a fluidizable powder.

The results given in Table I show that a lithium iodide-lithium hydroxide system supported on magnesia readily releases iodine from the supported lithium iodide by reaction with oxygen whereas the system utilizing sodium iodide-sodium hydroxide on the same magnesia support releases no iodine. However, when the sodium iodide-sodium hydroxide is supported on a suitable high melting inorganic acidic non-oxidizing solid support, e.g., silica, alumina or silica-alumina, iodine release and oxygen utilization efficiency superior to that from the lithium iodide-lithium hydroxide on magnesia system is obtained.

The conditions for carrying out the process of the present invention depend to a degree upon the particular compound to be converted, as well as upon the hydrocarbon desired as principal product.

The temperature required is at least about 300° C., generally being at least about 350° C. and usually preferably in the order of about 425 to 525° C., although higher temperatures may be utilized up to about 600° C. but preferably not above about 575° C. Higher temperatures are not objectionable so long as other undesirable changes are not brought about. In the case of less thermally stable substances, the temperature is more suitably adjusted within the lower range of values, such as about 400° to 500° C., and in some cases it may be as low as about 300° C. to 350° C. Conversely, in the case of more thermally stable substances, the temperature is more suitably adjusted at the higher range of values, such as about 5560–600° C., and it can even be 600–800° C.

Table II contains a summary of data obtained when iodinatively dehydrogenating n-butane and 2-methylbutane in contact with 3% by weight of sodium, calculated as NaOH, supported on alumina having a surface area of 150 meters$^2$/gram and a pore volume of 0.20 milliliter/gram. In order to show the overall efficiency of the process, the proportion of oxygen utilized in the separate regeneration step is shown as a molar ratio of oxygen to the hydrocarbon fed to the separate dehydrogenation step. The system employed was that of copending U.S. patent application 277,732, supra, i.e., wherein the regeneration occurred in upward flow while the dehydrogenation took place in downward flow. However, the regeneration-dehydrogenation can be carried out either in upward or downward flow or any combination of upward and downward flows, without detracting from the inherent advantages of the present invention.

TABLE II.—CONVERSION WITH SODIUM ON A HIGH-MELTING INORGANIC ACIDIC NON-OXIDIZING SOLID SUPPORT

| Feed | n-Butane | 2-Methyl-Butane |
|---|---|---|
| $O_2$/hydrocarbon, mol/mol | 0.83 | 0.92 |
| $N_2$/hydrocarbon | 4.7 | 5.6 |
| Temperature, ° C | 550 | 515 |
| Time of contact between HC and acceptor, sec. | 2.0 | 2.5 |
| Acceptor/hydrocarbon, wt./wt | 220 | 220 |
| Hydrocarbon conversion, percent | 71 | 67 |
| Percent selectivity to: | | |
| Dienes | 76 | 67 |
| Alkenes | 9 | 14 |
| Cracked products | 8 | 9 |
| $CO+CO_2$ | 4 | 6 |
| Total | 97 | 96 |
| Oxygen selectivity, percent | 69 | 57 |
| Iodine loss: Mole percent/double bond formed | 0.5 | 1.1 |

It is clearly illustrated by the preceding data that sodium oxide/hydroxide supported as disclosed herein is an outstanding acceptor and regenerable material for the dehydrogenation of $C_4$ and $C_5$ hydrocarbons.

I claim as my invention:

In a continuous process for the dehydrogenation of n-butane or 2-methylbutane in a dehydrogenation zone primarily to the corresponding diolefin by reaction in vapor phase with elemental iodine at a temperature above 300° C. and while intimately contacting reactants and resulting reaction products with a fluidized mass comprising a finely divided solid metal compound hydrogen iodide acceptor which reacts with hydrogen iodide formed by the dehydrogenation to form a non-volatile iodide of a metal component of the acceptor, the vaporous unreacted reactants and products are separated from the resulting solid containing metal iodide, the separated solid is intimately contacted with molecular oxygen to oxidize the iodide of the metal iodide to elemental iodine and regenerate the iodide acceptor, and the elemental iodine and regenerated iodide acceptor are recycled to the dehydrogenation zone, the improvement of using as the fluidized mass and finely divided hydrogen iodide acceptor a composite of finely divided porous alumina, silica or silica-alumina impregnated with, and phyiscally and chemically combined therewith, from 2 to 6% by weight sodium hydroxide.

References Cited
UNITED STATES PATENTS

| | | | |
|---|---|---|---|
| 3,106,590 | 10/1963 | Bittner | 260—680 X |
| 3,130,241 | 4/1964 | Baijle et al. | 260—680 X |
| 3,205,280 | 9/1965 | Wattimena et al. | 260—680 |

PAUL M. COUGHLAN, JR., *Primary Examiner.*